No. 652,180.
W. H. GREER.
PEA OR BEAN THRESHER.
(Application filed July 31, 1899.)
Patented June 19, 1900.
(No Model.)
2 Sheets—Sheet 1.
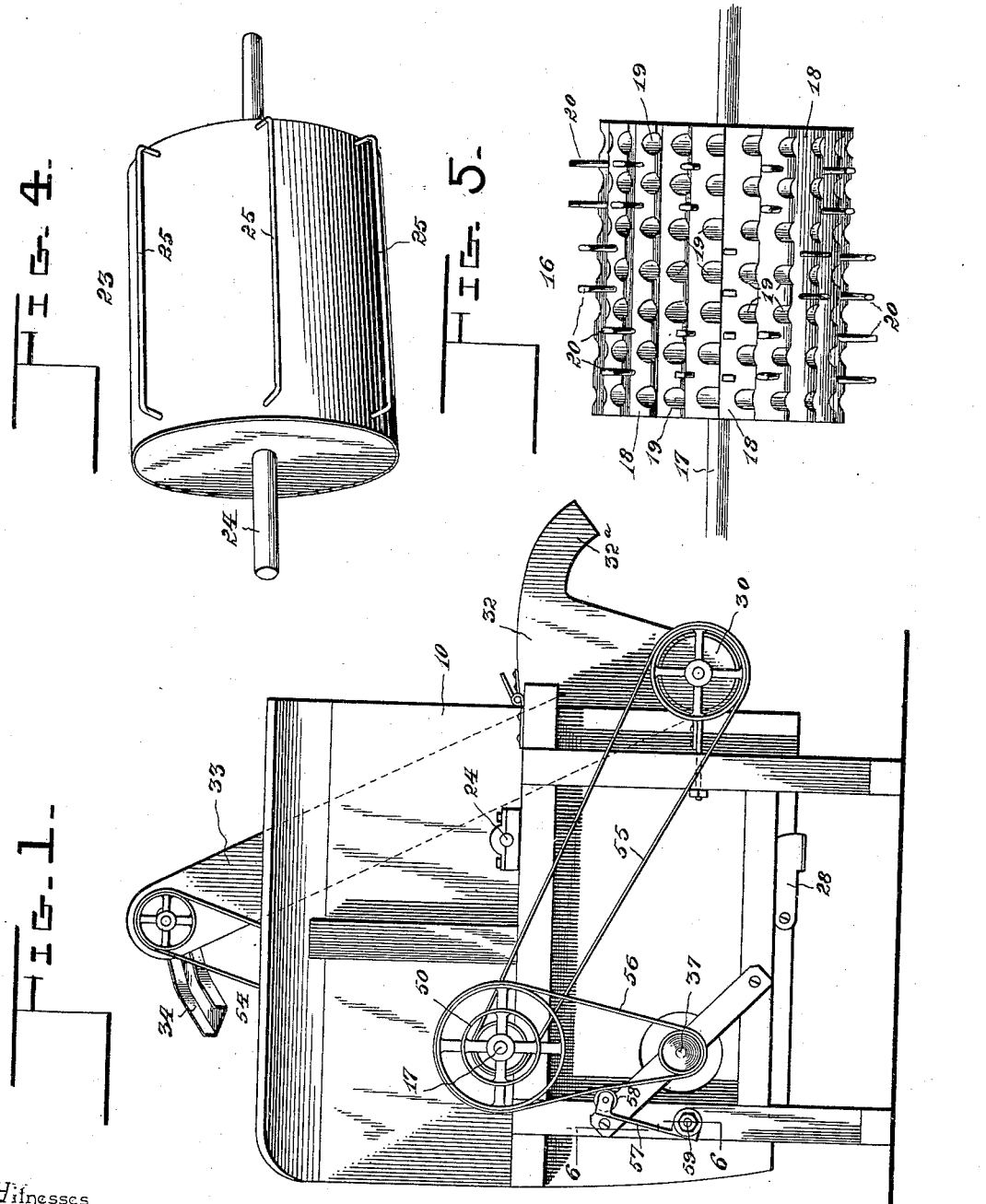
Witnesses
John A. Deufferwil
H. F. Bemkyso
By his Attorneys,
C. A. Snow & Co.
W. H. Greer, Inventor No. 652,180.  
W. H. GREER.  
PEA OR BEAN THRESHER.  
(Application filed July 31, 1899.)  
Patented June 19, 1900.
(No Model.)  
2 Sheets—Sheet 2.
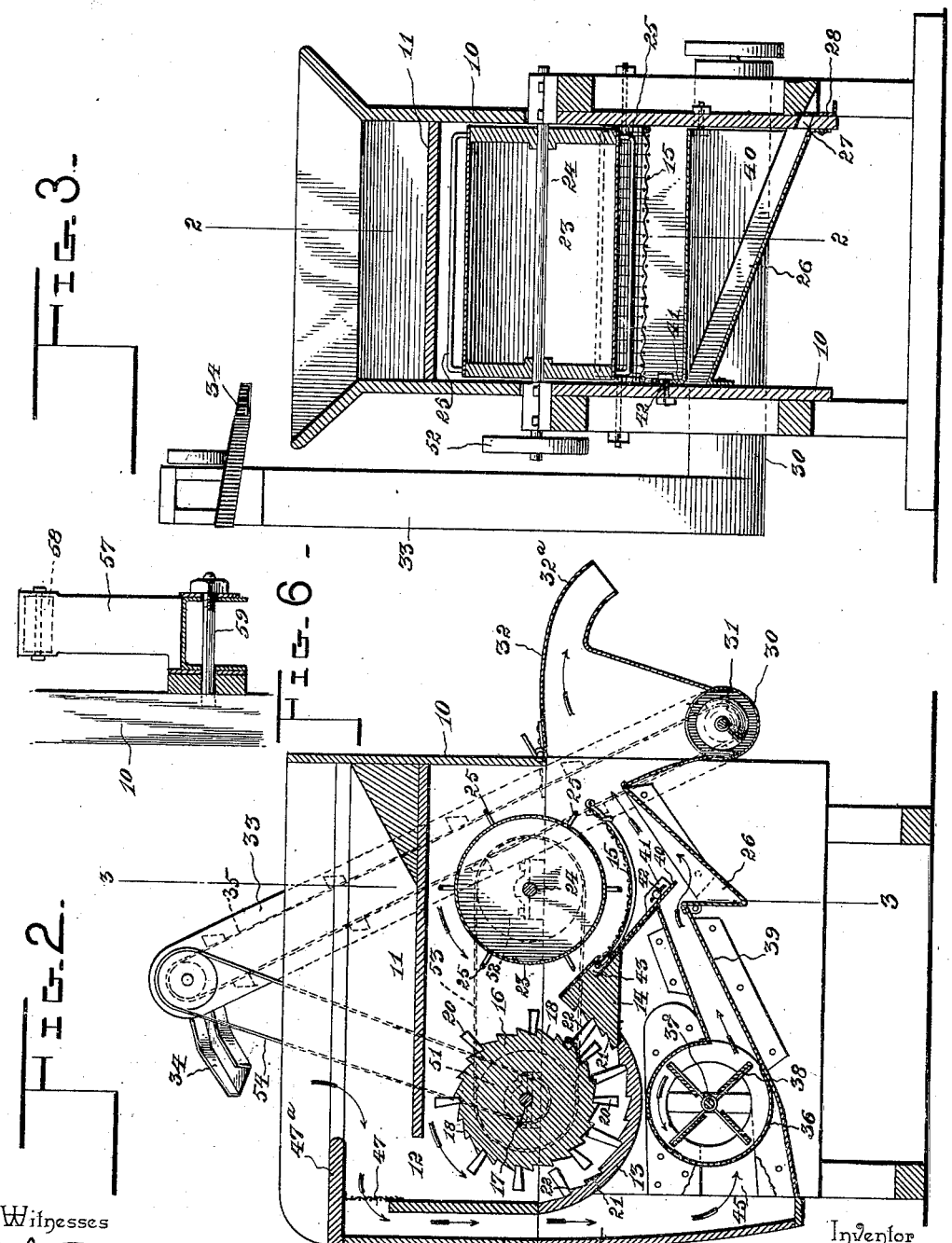

ured form in cross-section, is arranged with-
UNITED STATES PATENT OFFICE.

WILLIAM HILARY GREER, OF PARIS, TENNESSEE.

PEA OR BEAN THRESHER.

SPECIFICATION forming part of Letters Patent No. 652,180, dated June 19, 1900.

Application filed July 31, 1899. Serial No. 725,643. (No model.)

*To all whom it may concern:*

Be it known that I, WILLIAM HILARY GREER, a citizen of the United States, residing at Paris, in the county of Henry and State of Tennessee, have invented a new and useful Pea or Bean Thresher, of which the following is a specification.

My invention relates to threshing and separating machines especially designed for separating and cleaning peas or beans from the hulls thereof; and the prime object is to simplify and improve the machine with a view to increasing its efficiency.

A further object is to provide a novel cleaning mechanism by which the hulls and trash are effectually separated from the peas or beans and the latter are discharged from the machine in a clean condition.

A further object is to provide means serving the twofold purpose of delivering the peas or beans to the discharge-spout and of regulating the strength of the blast.

With these ends in view the invention consists in the novel combination, construction, and arrangement of parts, which will be hereinafter fully described and claimed.

In the drawings, Figure 1 is a side elevation of a threshing and separating machine embodying my invention. Fig. 2 is a vertical longitudinal sectional view on the plane indicated by the dotted line 2 2 of Fig. 3. Fig. 3 is a vertical transverse section on the plane indicated by the dotted line 3 3 of Fig. 2. Fig. 4 is a detail perspective view of the separating or feeder cylinder. Fig. 5 is a plan view, on an enlarged scale, of the threshing-cylinder. Fig. 6 is an enlarged detail view on the line 6 6 of Fig. 1.

The same numerals of reference are used to designate like and corresponding parts in each of the several figures of the drawings.

The framing or casing 10 of my machine may be of any approved construction and configuration. Said casing is provided, above the cleaning mechanism, with a feed-board 11, which may be disposed in a horizontal or inclined position, one end of said feed-board terminating within an end wall of the casing to provide an inlet-mouth 12. The threshing-concave 13 is arranged in the vertical plane of the inlet-mouth, at a suitable distance below the same, to provide a chamber adapted to contain the threshing-cylinder. One side of this threshing-concave is joined to an end wall of the casing 10; but the opposite side of said concave has its surface arranged to meet one face of a triangular cross-bar 14. A separating-screen 15, of curved form in cross-section, is arranged within the casing in substantially the horizontal plane of the triangular bar and the threshing-concave, said cross-bar 14 lying between the threshing-concave and the separating-screen. The screen may be of foraminous material or of sheet metal, the detailed construction of which is not material; but the openings or interstices of the screen should be sufficiently large for the peas or beans to pass therethrough. The concave, the cross-bar, and the curved screen may be supported within the frame by any suitable means known to the art; but, if desired, the sides of the concave and of the screen that lie contiguous to the cross-bar may be attached to or supported by said bar.

16 designates the threshing-cylinder, which is disposed above and in operative relation to the concave 13, the shaft 17 of said cylinder being journaled in suitable bearings on the frame. This cylinder is peculiarly constructed to operate efficiently in breaking short pods and fragments thereof as well as destroying the hulls of long pods. The cylinder of my invention has its working surface formed with a series of equidistant longitudinal channels which produce a plurality of longitudinal ribs 18, each rib extending across the surface of the cylinder and having one wall disposed radially to the axis of the cylinder, while its other wall is on a tangent to the circumference of the cylinder. Each rib of the threshing-cylinder has a series of transverse notches 19 formed therein, and the notches of all the ribs are arranged in corresponding positions on the entire series of the ribs, so that corresponding notches of the plurality of ribs aline one with the other circumferentially of the cylinder, as clearly shown by Fig. 5. The teeth or spikes 20 are secured to the cylinder in the intervals between the notches in the sharpened edges of the ribs 18, (see Fig. 5,) and I may arrange these teeth in pairs or in any other multiple and in staggered relation. The construction of the cylinder, with the notched ribs and with the teeth alternating with the notches in the ribs, provides a working surface that renders the cylinder adaptable to crushing short pods or the fragments of long pods, while the teeth will break up the long pods of peas or beans, thereby increasing the efficiency of the threshing mechanism. The concave 13 has its upper surface formed with a plurality of ribs 21, each arranged in a reverse position to the ribs on the cylinder, said concave also provided with teeth 22, which are disposed for the cylinder-teeth 20 to travel through the notches 19 in the cylinder. The cylinder is propelled to rotate in a direction indicated by the arrow in Fig. 2, and the ribbed cylinder coacts with the ribbed and toothed concave to crush or break the pods of the beans or peas.

The triangular bar 14 is arranged in a position between the concaved screen 15 and the threshing-concave 13, and the inclined face of this triangular bar, which lies next to the threshing-concave, is provided with ribs and teeth corresponding to the ribs and teeth of the threshing-concave, thus increasing the area of said concave. The concaved screen 15 of the screening mechanism has one edge secured to the other inclined face of the triangular bar in the manner shown by Fig. 2, so that the hulls and berries may pass over the triangular bar and be deposited upon the screen without catching in the edge of said concave, which is fastened to the triangular bar. The apex of the triangular bar forms a crest between the threshing-concave and the cleaning-screen, and the pods and berries are forced over this crest by the action of the ribbed and toothed threshing-cylinder, the beating-cylinder rotating in a direction to carry the crushed pods and berries over the concaved surface of the cleaning-screen.

The separating or beating cylinder 23 has its shaft 24 journaled in suitable bearings of the framing to lie parallel with and preferably in the horizontal plane of the shaft for the threshing-cylinder, said beating-cylinder occupying a coöperative relation to the curved screen 15. The beating-cylinder shown by Fig. 4 is provided with a plurality of loop-shaped beaters 25, the latter being secured firmly to the cylinder to extend lengthwise thereof. These beaters travel with the cylinder which rotates in the same direction as the threshing-cylinder, (see the arrows in Fig. 2,) and said beaters operate to sweep close to the curved screen, whereby the broken pods and peas or beans which are fed to the screen are agitated by the action of the beaters, so that the peas or beans will pass through the screen, while the broken hulls or pods will be swept along the screen and forced over the rear edge thereof.

Below the separating-screen 15 is disposed the trough-shaped pan 26, which is supported in the frame in any suitable way. This pan 26 is inclined transversely across the framing for its lowest point to deliver the peas or beans into a port or hole 27, which is formed in one side of the casing. This inclined pan has a section thereof inclined from a point below the delivery end of the curved separating-screen, so that the peas or beans which may pass through the screen will lodge upon the inclined pan to be carried thereby to the aperture 27. A flap or gate-valve 28 is supported on the casing contiguous to the port 27, said valve adapted to be closed across the port or to be opened to any desired extent which may be necessary.

30 designates a trough or casing supported in a horizontal position at the discharge end of the machine, one wall of said casing or trough 30 being extended upwardly to meet or join with the rear edge of the pan 26, as shown by Fig. 2. A screw conveyer or auger 31 is arranged within the trough 30, the shaft of said conveyer being journaled in proper bearings on the framing 10. A hood 32 is fitted to the discharge end of the machine frame or casing 10 for its lower edge to fit or join with the trough 30, said hood having a discharge-spout 32ª, arranged for its receiving-mouth to lie in the horizontal plane of the discharge end of the separating-screen 15.

33 designates an elevator boot or casing which is supported on the machine-frame at one side thereof. The lower end of this elevator-boot is joined with the conveyer-trough 30 in order that the screw conveyer may carry the tailings to the boot of the tailings-return elevator 35, the latter being indicated by dotted lines in Fig. 2. This boot and the elevator therein are inclined from the screw-conveyer trough toward the front end of the machine in order to present the return-spout 34, attached to the upper end of the elevator-boot, in a position for the tailings to be delivered to the feed-board 11 at a point contiguous to the inlet-mouth 12.

A combined blast and suction fan is supported below the concave 13, preferably in the vertical plane of the threshing-cylinder. The casing 36 of this fan is secured to the machine frame or casing 10 in any suitable way, and through this fan-casing extends a horizontal shaft 37. A fan 38, of any approved construction, is mounted on the shaft 37 to rotate therewith. From the fan-casing extends the spout 39, the rear end of which terminates below the separating-screen 15. The bottom wall of the spout 39 is joined to the front vertical wall of the inclined pan 26, and the blast from the fan is thus adapted to traverse the pan to be discharged against the peas or beans as they drop from the screen and lodge upon the inclined pan, whereby the small pieces of pods and light peas or beans are carried by the blast over the rear edge of the inclined pan and into the screw conveyer 31.

40 designates an apron which is arranged in an inclined position below the separating-screen 15, so as to have its lower edge extend more or less across the mouth of the spout 39 and to terminate above the inclined pan 26. This apron 40 is adjustably supported within the machine frame or casing by providing suitable flanges 41, having longitudinal slots adapted to receive the bolts 42, that serve to adjustably attach the apron to the machine frame or casing. One face of the triangular cross-bar 14 is provided with a recess 43, adapted to receive the upper edge of the inclined apron, said bar thus serving as the support for the upper part of the apron, which serves to close the space between the bottom of the bar and the wind-spout 39 of the blast-fan, thus preventing the peas or beans from lodging upon the fan-casing or its spout. By arranging the apron in an inclined position between the inclined pan and the screen and by adjustably supporting said apron with relation to the mouth of the wind-trunk from the fan-casing the apron is made to serve a twofold purpose. First it directs the peas or beans upon the inclined pan 26, and it may be adjusted to regulate the strength of the blast which acts on the peas or beans to carry the pods and foreign matter therefrom. It is evident that the elevation of the apron enlarges the area of the mouth from the wind-trunk 39, thus decreasing the strength while enlarging the volume of the blast; but the adjustment of the apron in a downward direction concentrates the energy of the blast which issues from below the apron.

44 indicates a vertical wind-trunk provided at the front end of the machine. This wind-trunk is equal to the width of the machine; but the fan-casing 36 is made somewhat shorter than the width of the machine and is arranged within the framing or casing 10 to provide spaces 45, which serve to establish communication between the ends of the fan-casing and the lower part of the vertical wind-trunk 44, whereby the air may travel through the wind-trunk and the ports 45 to the fan-casing when the fan is in motion. The upper end of the wind-trunk has a screened inlet-mouth 47 on a plane above the feed-board 11, said wind-trunk also provided with a lip 47ª, that overhangs the feed-mouth 12 of the machine-casing. It will be observed that a suction-current is created through the vertical wind-trunk by the rotation of the fan for the purpose of drawing the dust which may be mixed with the peas or beans delivered by the feed-board 11 to the machine, and a single fan 38 thus serves to create a suction-current through the vertical wind-trunk and to deliver a blast of air through the inclined or horizontal wind-trunk and the spout 32.

50 designates a driving-pulley which is secured to one end of the cylinder-shaft 17, and around this pulley passes a belt which is driven from another pulley or a band-wheel driven from a suitable source of power. The shafts of the threshing-cylinder and the beater-cylinder are provided with pulleys 51 52, connected by a belt 53, as shown by dotted lines in Fig. 2, to drive the beater-cylinder from the threshing-cylinder and to make the beater-cylinder rotate in the same direction as the threshing-cylinder. A belt 54 extends from a pulley on the threshing-cylinder shaft to a pulley on one shaft of the elevator for the propulsion of the latter. Another belt 55 extends from a pulley on the thresher-cylinder shaft to a pulley on the shaft of the screw conveyer. A belt 56 connects the fan-shaft with the threshing-cylinder shaft; but this belt is of such length that it may slip idly around the pulley on the fan-shaft. To regulate the speed of the fan and the strength of the blast generated by such fan, I have provided an adjustable arm 57. This arm carries an idler-roller 58, adapted to ride against the belt 56, and said arm is held firmly in either of its adjusted positions on the frame by a clamping-bolt 59, as shown by Figs. 1 and 6. It is evident that the arm may be adjusted and held in place for its idler-roller to take more or less of the slack in the belt, and thus the slippage of the belt around the fan-shaft pulley may be varied within certain limits. By making the belt quite tight the fan may be driven at its maximum speed; but by adjusting the arm the belt may have a certain amount of slippage on the fan-shaft pulley, thus reducing the strength of the air-current.

The operation is as follows: The parts having been properly adjusted and the several shafts set in motion, peas or beans in the pods are dumped on the feed-board 11 and thence pass through the mouth 12. The threshing-cylinder and concave thresh the pods, and the cylinder rotates in a direction to force the pods and peas or beans over the triangular bar 14, so as to lodge upon the screen. The beater-cylinder carries the hulls or pods across the screen, so as to discharge them in the path of the blast which blows the hulls and pods through the hood and out of the spout 32ª. The peas or beans pass through the screen, some of them falling upon the apron 40 and the spout 26; but before they reach the inclined pan they are exposed to the action of the blast from the spout 39, said blast of air carrying the tailings into the trough 30. The rotation of the fan creates a suction-current through the vertical wind-trunk and its screened mouth, and the current of air traverses the peas and beans as they pass into the mouth 12, thereby drawing the dust and dirt from the peas. The tailings are conveyed by the screw to the foot of the boot 33, from whence they are carried by the elevator to the spout 34 for delivery to the mouth 12 of the machine.

Changes may be made in the form and proportion of some of the parts, while their essential features are retained and the spirit of the invention embodied. Hence I do not desire to be limited to the precise form of all the parts as shown, reserving the right to vary therefrom.

Having thus described the invention, what I claim is—

1. In a thresher for peas and beans, the combination with the threshing mechanism, of the beater-cylinder, the concave screen below the latter, the receiving-trough below the said screen, the fan having the discharge-spout terminating between said screen, and said receiving-trough, and having the air-intake at the mouth of the threshing mechanism, the tailings-conveyer in an inclosed casing communicating with the discharge-spout of the fan and having an air-discharge on the upper side, whereby the air-blast passes laterally over said tailings-conveyer, and the elevator communicating with said tailings-conveyer and with the feed-mouth of the threshing mechanism, for the purpose set forth, substantially as described.

2. In a thresher for peas and beans, the combination with the threshing mechanism, of the beater-cylinder, the concave screen below the latter, the receiving-trough below the said screen, the fan having the discharge-spout terminating between said screen and said receiving-trough, and the inclined apron, between said screen and receiving-trough, said apron being adjustable across the fan outlet or spout to regulate the strength of the blast, substantially as described.

In testimony that I claim the foregoing as my own I have hereunto affixed my signature in the presence of two witnesses.

WILLIAM HILARY GREER.

Witnesses:
D. J. TAYLOR,
W. A. VAUGHN.